(12) United States Patent
Nahari et al.

(10) Patent No.: US 8,244,026 B2
(45) Date of Patent: Aug. 14, 2012

(54) APPARATUS AND METHOD FOR AUTOMATIC AIRBORNE LIDAR DATA PROCESSING AND MAPPING USING DATA OBTAINED THEREBY

(75) Inventors: Alon Nahari, Givataim (IL); Ehud Menaker, Maccabim-Reut (IL); Ofer Nahari, Herzlia (IL); Eli Neiman, Beer-Sheva (IL); Vadim Gusis, Ashdod (IL)

(73) Assignee: Tiltan Systems Engineering Ltd., Petach-Tikva (IL)

( * ) Notice: Subject to any disclaimer, the term of this patent is extended or adjusted under 35 U.S.C. 154(b) by 890 days.

(21) Appl. No.: 12/318,783

(22) Filed: Jan. 8, 2009

(65) Prior Publication Data

US 2009/0185741 A1 Jul. 23, 2009

Related U.S. Application Data

(60) Provisional application No. 61/006,370, filed on Jan. 9, 2008.

(51) Int. Cl.
*G06K 9/00* (2006.01)

(52) U.S. Cl. .......................... 382/154; 382/285; 382/190

(58) Field of Classification Search .................. 382/154, 382/285, 190
See application file for complete search history.

(56) References Cited

U.S. PATENT DOCUMENTS

| | | | |
|---|---|---|---|
| 6,757,445 B1 * | 6/2004 | Knopp | 382/285 |
| 7,187,809 B2 * | 3/2007 | Zhao et al. | 382/285 |
| 7,363,157 B1 * | 4/2008 | Hanna et al. | 702/5 |
| 8,139,863 B1 * | 3/2012 | Hsu | 382/190 |
| 2005/0031197 A1 * | 2/2005 | Knopp | 382/154 |
| 2005/0286101 A1 * | 12/2005 | Garner et al. | 359/9 |
| 2007/0031064 A1 * | 2/2007 | Zhao et al. | 382/285 |

* cited by examiner

*Primary Examiner* — Hadi Akhavannik

(57) ABSTRACT

Apparatus for processing of a LiDAR point cloud of a ground scan, comprises: a point cloud input for receiving said LiDAR point cloud, a ground filter for filtering out points that belong to the ground from said point cloud, thereby to generate an elevation map showing features extending from the ground, an automatic feature search and recognition unit associated with said three dimensional graphical engine for searching said elevation map of said three-dimensional model to identify features therein and to replace points associated with said feature with a virtual object representing said feature, thereby to provide objects within said data; and a three-dimensional graphical renderer supporting three-dimensional graphics, to generate a three-dimensional rendering of said ground scan.

18 Claims, 15 Drawing Sheets
(12 of 15 Drawing Sheet(s) Filed in Color)

APPARATUS AND METHOD FOR AUTOMATIC AIRBORNE LIDAR DATA PROCESSING AND MAPPING USING DATA OBTAINED THEREBY

FIELD AND BACKGROUND OF THE INVENTION

The present invention, in some embodiments thereof, relates to LiDAR and aerial mapping of the ground topography, and more particularly but not exclusively to the mapping process using the data obtained from the LiDAR sensor.

LiDAR, an acronym for Light Detection and Ranging, is a sensor that enables rapid generation of dense, accurate, digital models of the topography and vertical structure of a target surface.

The airborne LiDAR laser sensor is mounted on the underside of an aircraft. It transmits pulses of narrow laser beam towards the earth as the aircraft flies. A receiver affixed to the aircraft receives reflections of the pulses as they bounce off the ground surface, and objects on the ground, back to the aircraft. Most LiDAR systems use a scanning mirror to generate a swath of light pulses. Swath width depends on the mirror's angle of oscillation, and the ground-point density depends on factors such as aircraft speed and mirror oscillation rate. Each LiDAR laser reflection provides a single point on the ground. Ranges are determined by computing the amount of time it takes light to leave an airplane, travel to the ground and return to the sensor. The precise position and altitude of a sensing unit, instantaneous scan mirror angle and the collected ranges are used to calculate 3-D positions of terrain and object points from the detected reflections.

The LiDAR data is typically coupled with additional precise positioning information gathered by on board Global Positioning Instruments (GPS) and other Inertial Navigation Systems (INS). Once the total information volume is stored and processed, the result is an extremely accurate "x.y.z." mapping for every position scanned on the ground.

FIG. 1 shows a basic system in which an aircraft uses a laser beam to scan the ground and detect reflections. GPS data is used to fix the position of the aircraft, with which position the LiDAR data can be correlated to the ground.

LiDAR collects on average 10 points per square meter so a flight that covers 50 Sq. Km acquires approximately $2*10^{10}$ data points to be processed, and one of the issues preventing widespread acceptance of LiDAR is the lack of software tools that automatically and efficiently process the LiDAR data. In general today the raw LiDAR data is given to a specialist, who interprets the data in terms of recognizing and indicating structures on the ground. Thus huge numbers of man-hours are spent on LiDAR data, making the final product very expensive.

SUMMARY OF THE INVENTION

The present invention in some embodiments separates incoming LiDAR data into ground and elevation points creating a terrain model and a surface model and later on vectors and other information forms describing culture features such as roof shapes, trees, power lines etc. as will be explained below.

According to a first aspect of the present invention there is provided apparatus for processing of a LiDAR geo-referenced point cloud of a ground scan, comprising:

a point cloud input for receiving said LiDAR point cloud said point cloud including ground topography and above-ground features, a ground filter for filtering out points that belong to the ground topography from the above ground features, thereby to isolate those points of said point cloud belonging to said above-ground features, an automatic feature search and recognition unit associated with said three dimensional graphical engine for searching said points belonging to said above-ground features to identify said above ground features therefrom and to replace points associated with a respective feature with a virtual object representing said feature, thereby to provide objects within said data; and a three-dimensional graphical modeler for generating a three dimensional model of said ground scan from said ground topography and said virtual objects.

In an embodiment, said ground filter comprises a terrain modeler for searching said scan from below using a skin of relatively high rigidity to form a terrain model, and a surface modeler for searching said scan from above using a skin of relatively low rigidity to form a surface model, such that points appearing in said surface model but not in said terrain model are identifiable as said points belonging to said above-ground points.

In an embodiment, said automatic feature search and recognition unit is configured to search said points belonging to above ground features for regions where said points lie substantially in a plane and to draw boundaries around said region, thereby to fit said virtual objects within said boundaries.

An embodiment may comprise a graphical user interface to allow a user to compare said virtual objects with said point cloud.

In an embodiment, said graphical user interface is configured to support at least one member of the group of operations comprising: rotation, viewing of points, viewing of virtual objects and comparison between detected LiDAR points and virtual objects.

In an embodiment, the graphical user interface is configured to support at least one member of the group of operations comprising: confirmation of virtual objects, rejection of virtual objects and addition of virtual objects.

In an embodiment, the graphical user interface is configured to support a user suggestion for insertion of a virtual object and subsequent submission of said suggestion to said automatic feature search and recognition unit for consideration.

According to a second aspect of the present invention there is provided a method for processing of a LiDAR point cloud of a ground scan, comprising:

receiving said LiDAR point cloud, automatically recognizing features therein, and generating a three dimensional model of said ground scan, said model comprising said automatically recognized features.

The method may comprise filtering out points that belong to the ground from said point cloud, thereby to generate an elevation map showing features extending from the ground, therefrom to carry out said automatically recognizing.

The method may comprise searching or scanning to compare points of said point cloud with recognized features, and replacing features according to said comparing.

The method may comprise providing a graphical user interface to allow a user to carry out said comparing.

The method may comprise providing said graphical user interface with at least one member of the group of operations comprising: rotation, viewing of points, viewing of virtual objects and comparison between detected LiDAR points and virtual objects.

The method may comprise providing the graphical user interface with at least one member of the group of operations comprising: confirmation of virtual objects, rejection of virtual objects and addition of virtual objects.

The method may comprise providing the graphical user interface with a user suggestion for insertion of a virtual object into said model and subsequent repeating of said rendering.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified diagram showing the use of an aircraft for gathering LiDAR information according to the known art;

FIG. 2 is an image taken directly from LiDAR data, and shows raw LiDAR point cloud presented in 3D presentation;

FIG. 3 is a simplified block diagram showing apparatus for processing LiDAR data according to a first preferred embodiment of the present invention;

FIG. 4 is a simplified block diagram illustrating a procedure for processing LiDAR data from a point cloud according to a preferred embodiment of the present invention;

FIG. 5 is a simplified block diagram showing the process of FIG. 4 in greater detail;

FIG. 6 shows a digital surface model (DSM) in which a relatively flexible skin is placed over the LiDAR points of FIG. 2;

FIG. 7 shows the results of searching for the outlines of flat surface features within an elevation map formed by filtering out the ground points from FIG. 6;

FIG. 8 shows the result of having inserted objects in accordance with the outlines inserted in FIG. 7 to provide a three-dimensional model of the region in accordance with the embodiments of the present invention;

FIG. 9 is a simplified flow chart showing in greater detail part of the process illustrated in FIG. 5;

FIG. 10 is a flow chart illustrating an embodiment of the present invention for identifying power lines; and FIGS. 11-15 show screen shots of the identification of actual power lines using the procedure of FIG. 10.

DESCRIPTION OF EMBODIMENTS OF THE INVENTION

The present invention, in some embodiments thereof, relates to LiDAR and aerial mapping of ground topography, and more particularly but not exclusively to a mapping process using data obtained from the LiDAR sensor.

The raw LiDAR data may be inserted into a bare earth filter unit which calculates ground height over the data, bearing in mind that topography can vary over the data gathering area. Once ground height is calculated then all points relating to the ground are removed to leave only those points relating to features superimposed on the ground such as trees and buildings. These features may then be resolved into specific objects. Then the data points identified as these specific objects can be automatically replaced by virtual versions of the objects.

The result may then be included in a 3D model.

The result of the above processing may then be presented to the specialist to confirm, add or correct the result using a graphical interface, which also allows rotation of the view and manual confirmation or addition or deletion of objects. Changes are then included in a revised 3D model.

The 3D model can then be rendered for different points of view, allowing a user to carry out virtual travel through the model. Three-dimensional rendering of the model may take advantage of the computer's graphics card and thus the result is to provide a rendering of the interpreted LiDAR image while saving in all three of time, human resources and hardware resources.

Figure 1:
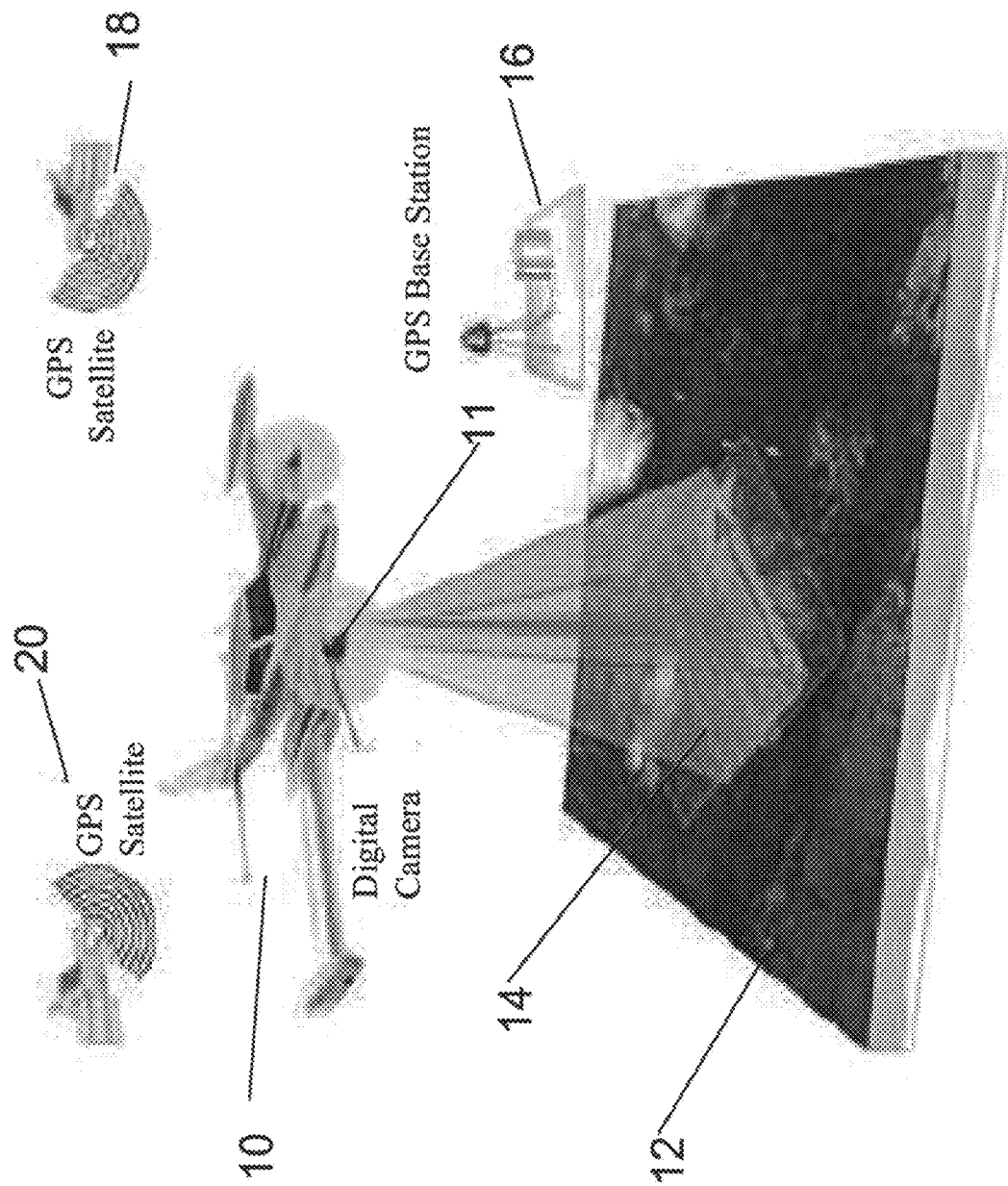
Figure 2:
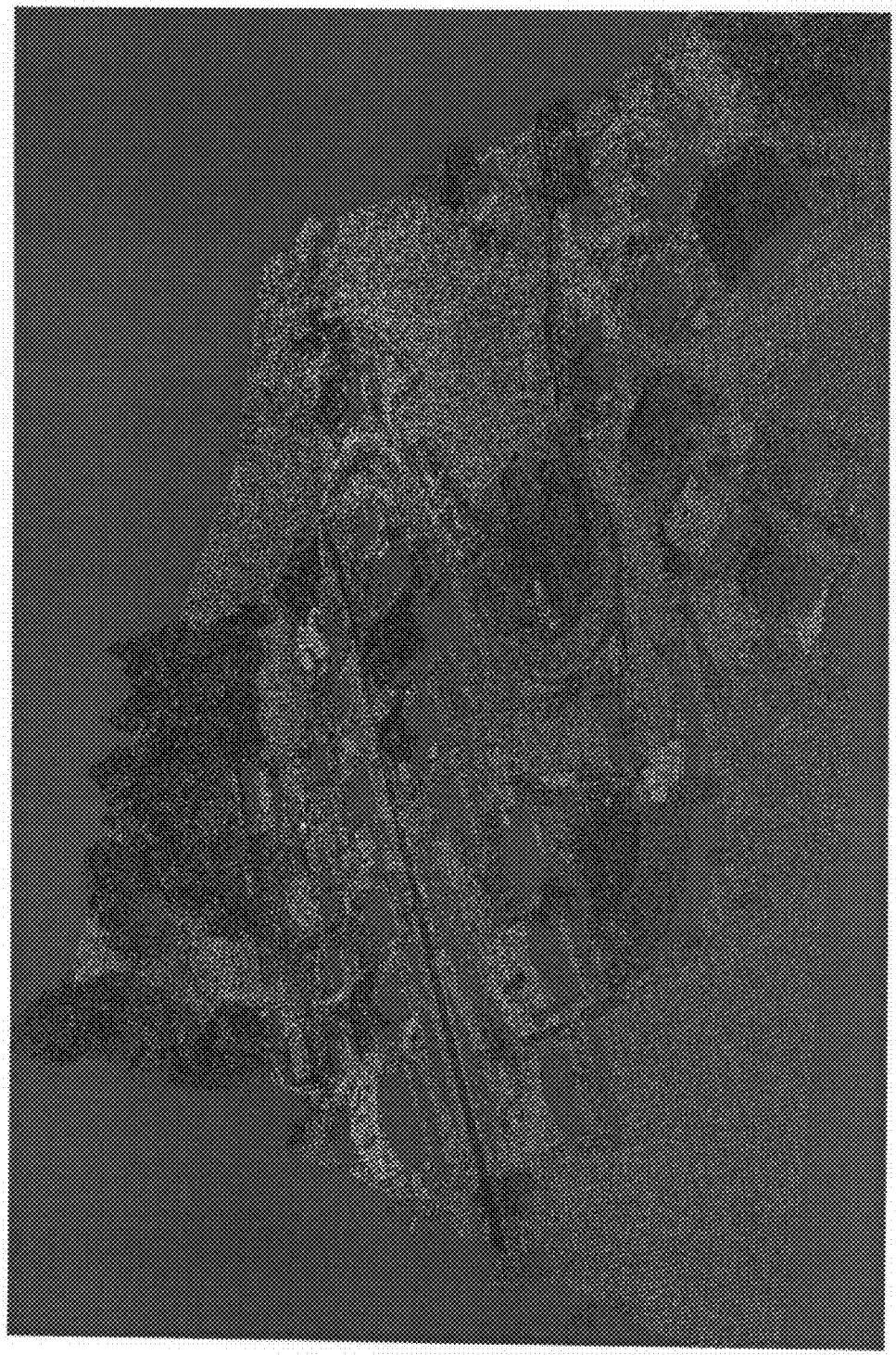

For purposes of better understanding some embodiments of the present invention, as illustrated in FIGS. 3-9 of the drawings, reference is first made to the construction and operation of a conventional (i.e., prior art) LiDAR system as illustrated in FIG. 1, producing a result as illustrated in FIG. 2.

In FIG. 1, aircraft 10 carries a LiDAR sensor 11 on its underside, which scans the ground 12 with laser pulses. A typical scan pattern 14 is shown. The pulses are reflected by the ground and by objects on the ground and many of the reflections reach the aircraft where they are detected. As with radar the reflection time of each pulse is used to calculate a distance, and thus each reflected pulse indicates the height of the ground (plus object height) at a given point.

The LiDAR thus builds up a point cloud of data. Each point may be correlated with the current position of the aircraft, which can be obtained very accurately using Global Positioning System and Inertial Measurement Unit. Positioning data from a GPS ground reference station 16 is used to enhance the Global Positioning System information. The output is a geo-referenced point cloud.

Reference is now made to FIG. 2, which illustrates raw LiDAR data as obtained directly from the point cloud. Features are clearly visible but not interpreted, and the current way to interpret the image is to supply it to a human specialist who marks the image with buildings, roads, trees, etc. It is noted that only upper surfaces are present in the point cloud and so buildings appear as hollow roof shapes, and trees appear as trunkless canopies.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 3:
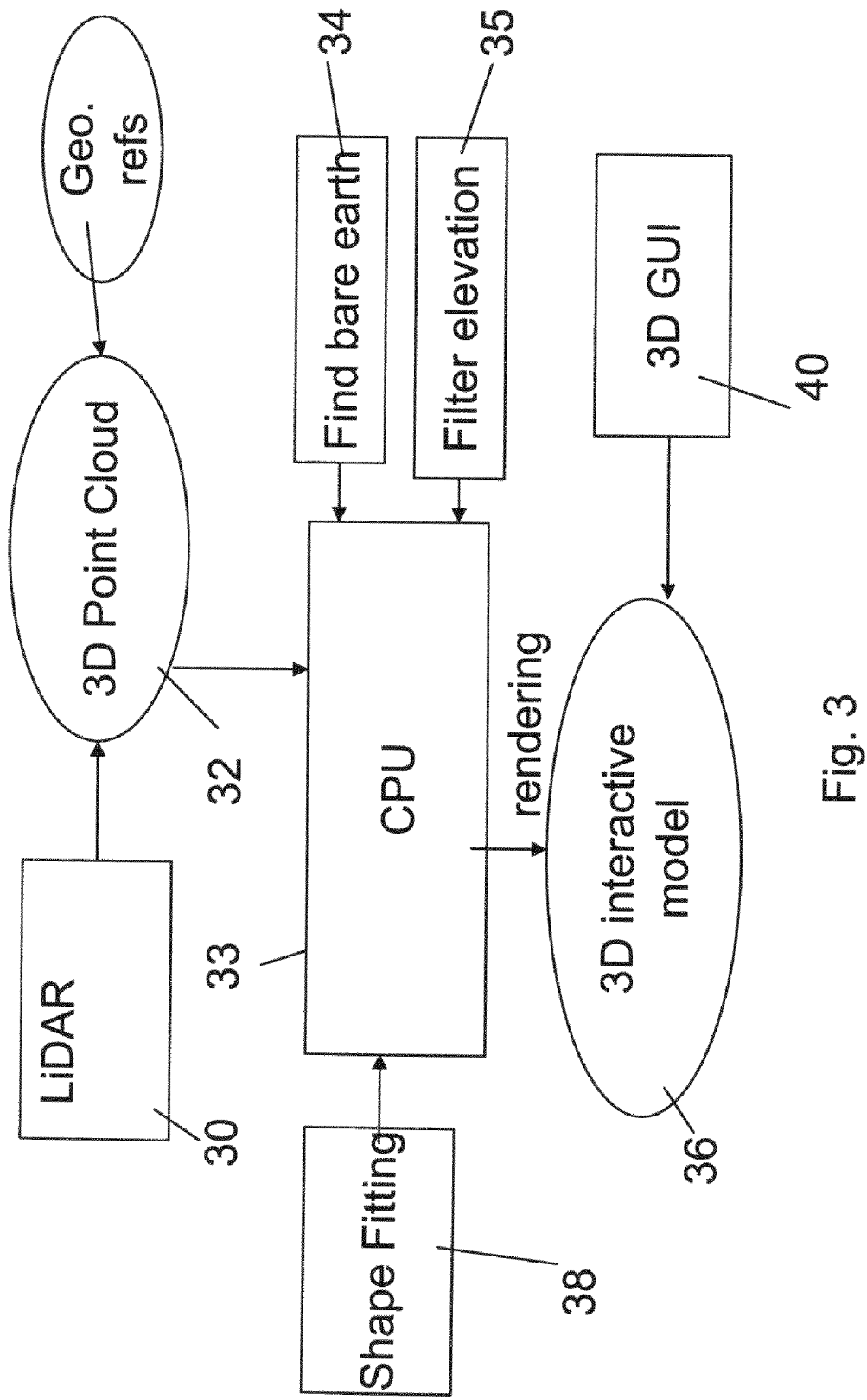

Reference is now made to FIG. 3, which is a generalized diagram of a LiDAR processing system according to a first embodiment of the present invention. As shown in FIG. 3 a LiDAR system 30 provides a geo-referenced point cloud 32, which has been produced by a LIDAR scan of the ground and geo-referenced by other software packages, as input to a CPU 33.

The data is input to CPU 33, which then identifies the ground topology by first making a digital terrain model of the date and then a digital surface model of the data in the find bare earth unit 34, and filters out the ground points to leave the elevation points in elevation filter 35.

The digital terrain model is obtained by a process analogous to expanding a balloon from below. The walls of the balloon are given certain rigidity so that they do not expand into features in the landscape but they do expand to define the landscape itself. The digital surface model is obtained by virtually expanding a balloon from above, but this time with less rigidity so that the effect is to provide a skin over the points from above. Points in both models may then be assumed to be terrain points and points only in the surface model may be assumed to belong to above-ground features or elevation features.

Figure 6:

FIG. 6 illustrates the digital surface model, DSM. The LiDAR data with the recognized shape is fitted with a flexible skin to produce the digital surface model.

The elevation points are then analyzed by object recognition using shape fitting unit 38. Object recognition by shape fitting may work as follows: once non bare earth points—that is the elevation points are found—the area is divided into blocks. At each block one may look for points that may be part of a plane. Boundaries around the plane are then searched for and drawn in.

The blocks may interlap so that planes that fall between two blocks can be matched up.

All planes from all blocks are then entered into a software machine that takes the planes and connects planes that overlap or intersect and tries to find the connection lines between intersecting planes—thus producing the shapes of the roofs and therefore determining a perimeter for potential buildings.

The perimeters are then fitted with buildings taken from a library.

The shape fitting can be used to search for features in the data, such as power lines, trees, walls, etc, not just buildings. When such a feature is found it is replaced by a virtual object representative of the feature from the library as mentioned. Thus whereas the original point cloud may have had an outline of a roof, which is all of a building that is usually seen from above, the data may now be automatically fitted with a three dimensional building fitted under the bounds of the detected roof and including walls and typical building coloring. Likewise regions having outlines suggestive of trees can have virtual objects indicating the trees. Power lines, roads, walls and other surface features may likewise be found by the shape fitting unit 38.

Figure 7:
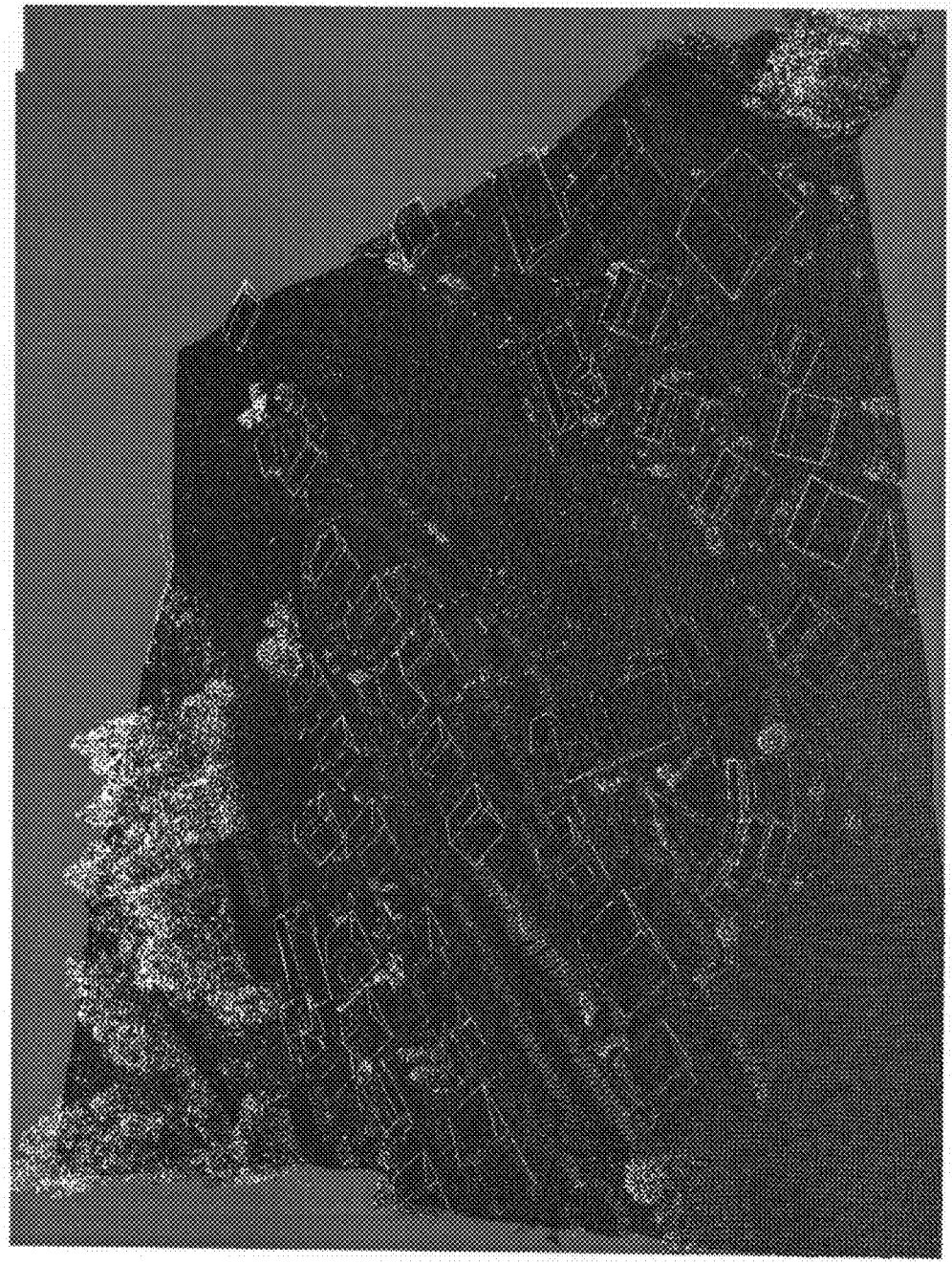

That is to say, automatic shape fitting unit 38 searches the elevation points to identify features and replace the points associated with the feature with a virtual object that represents the feature. The result of searching for planes is to provide delineated features on the model, as shown in FIG. 7 to be discussed below.

One issue that arises is that due to the rigidity of the skin in the terrain model, sharp edges in the terrain, such as edges of cliffs or railway or highway cuttings may be missed in the terrain model and erroneously appear as planes in the surface model. A correction feature thus searches for planes which are continuous with the ground topography so that they are correctly recognized as topography features nonetheless. The automatic searching saves a great deal of time and labor, however automatic results may not be considered reliable enough and manual intervention by an expert may still be required for quality control. Interface 40 allows such an expert to interact with the model formation process in order to provide the necessary quality control. In particular it allows the expert to rotate the model, zoom in and out and pan, to compare the original LiDAR points and the surface model with the objects that have been inserted. In some cases the expert may see that points have been misinterpreted, and that objects have been added which should not have been. Such objects may be marked for deletion. In other cases the expert may see that points have been ignored, and he may mark an object for addition. In other cases the Expert may wish to substitute one object for another.

The interface may allow the expert to add or remove objects in an absolute sense, or the expert may add or remove the objects as suggestions which are then returned to the CPU engine for re-processing.

An advantage of being able to rotate, zoom and pan the model is that a grouping of points which is apparent from one angle may look completely different from another angle.

The expert makes his changes or suggestions to object recognition module and to the bare earth module and then the calculations are repeated. The checking process may be repeated until the expert is satisfied.

Figure 4:
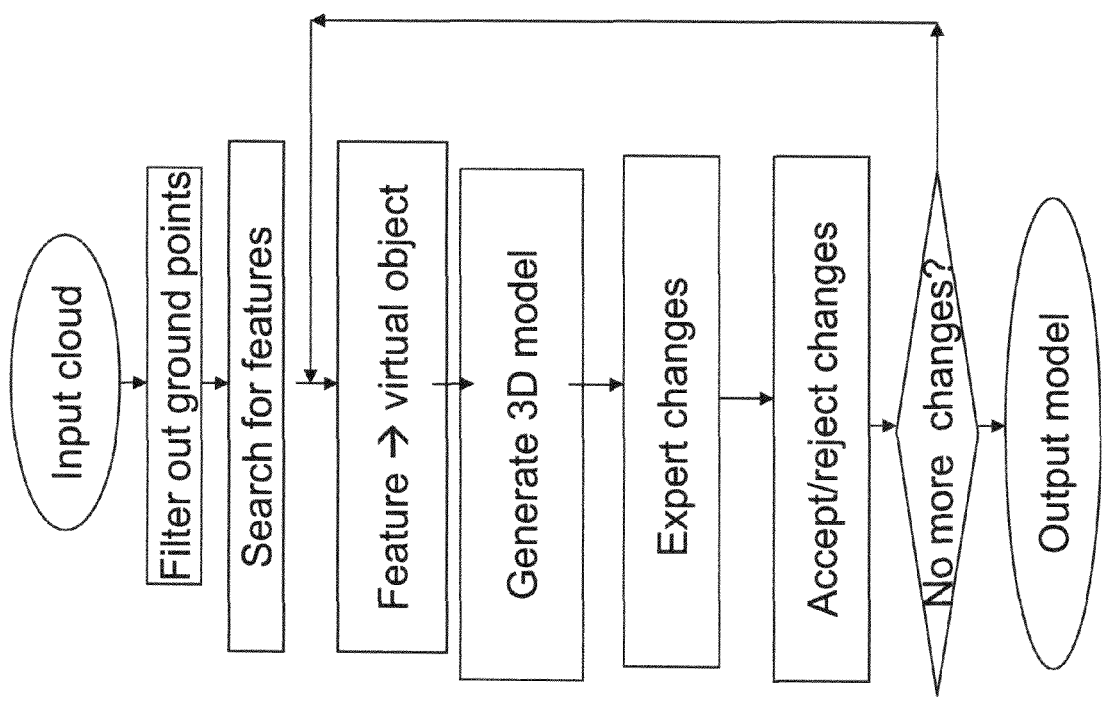

Reference is now made to FIG. 4 which is a simplified flow chart illustrating the above process. The method comprises receiving the LiDAR point cloud. Then a stage of identifying ground and objects is entered. In this stage the ground topology is identified and ground points are filtered out to leave elevation points. The elevation points are then searched for human features and fitted with virtual objects. The results is then rendered into a 3D model.

A loop is then provided in which an expert makes changes using the graphical interface. The changes are incorporated into the model until the expert is satisfied and then the resulting model is produced as the final output.

The resulting 3D model may be used in itself. Alternatively the model can be used to transform airborne LiDAR geo-referenced point clouds into layers for a graphical information system (GIS).

The geographic information system (GIS), also known as a geographical information system or geospatial information system, is a system for capturing, storing, analyzing and managing data and associated attributes which are spatially referenced to the Earth.

In the strictest sense, it is an information system capable of integrating, storing, editing, analyzing, sharing, and displaying geographically-referenced information. In a more generic sense, GIS is a tool that allows users to create interactive queries (user created searches), analyze the spatial information, edit data, maps, and present the results of all these operations.

Geographic information system technology can be used in applications as diverse as scientific investigations, resource management, asset management, Environmental Impact Assessment, Urban planning, cartography, criminology, history, sales, marketing, and logistics. For example, GIS might allow emergency planners to easily calculate emergency response times in the event of a natural disaster, GIS might be used to find wetlands that need protection from pollution, or GIS can be used by a company to site a new business to take advantage of a previously underserved market. For our present purposes the LiDAR data provided according to the present embodiments can be added as a layer to the GIS.

Returning to the present embodiments, and, as apparent from the background, the large quantities of data recorded by airborne LiDAR take a long time to process using current solutions. The present embodiments provide an automatic solution for airborne LiDAR data processing. This solution has the capability to handle large quantities of data, process them and create output, say in the form of DTM, DSM and SHP files that include specific representations of buildings, trees, power-lines and more feature layers. The embodiment thus automatically creates a 3D view of the mapped area.

The present embodiments may enable at least some of the following goals:
1. Enable LiDAR operators to take a substantial amount of data, say a day's worth, load it on a hard disk, and start processing the data automatically.
2. Enable a single operator to process quantities of LiDAR data that erstwhile would have required teams of experts, while at the same time the software ensures a certain level of accuracy.
3. Reduce overall LiDAR data processing times.

The present approach of automatic processing plus manual quality control on a three-dimensional platform increases the confidence that the mapped area has been well covered and that the collected data is up to date.

Figure 5:
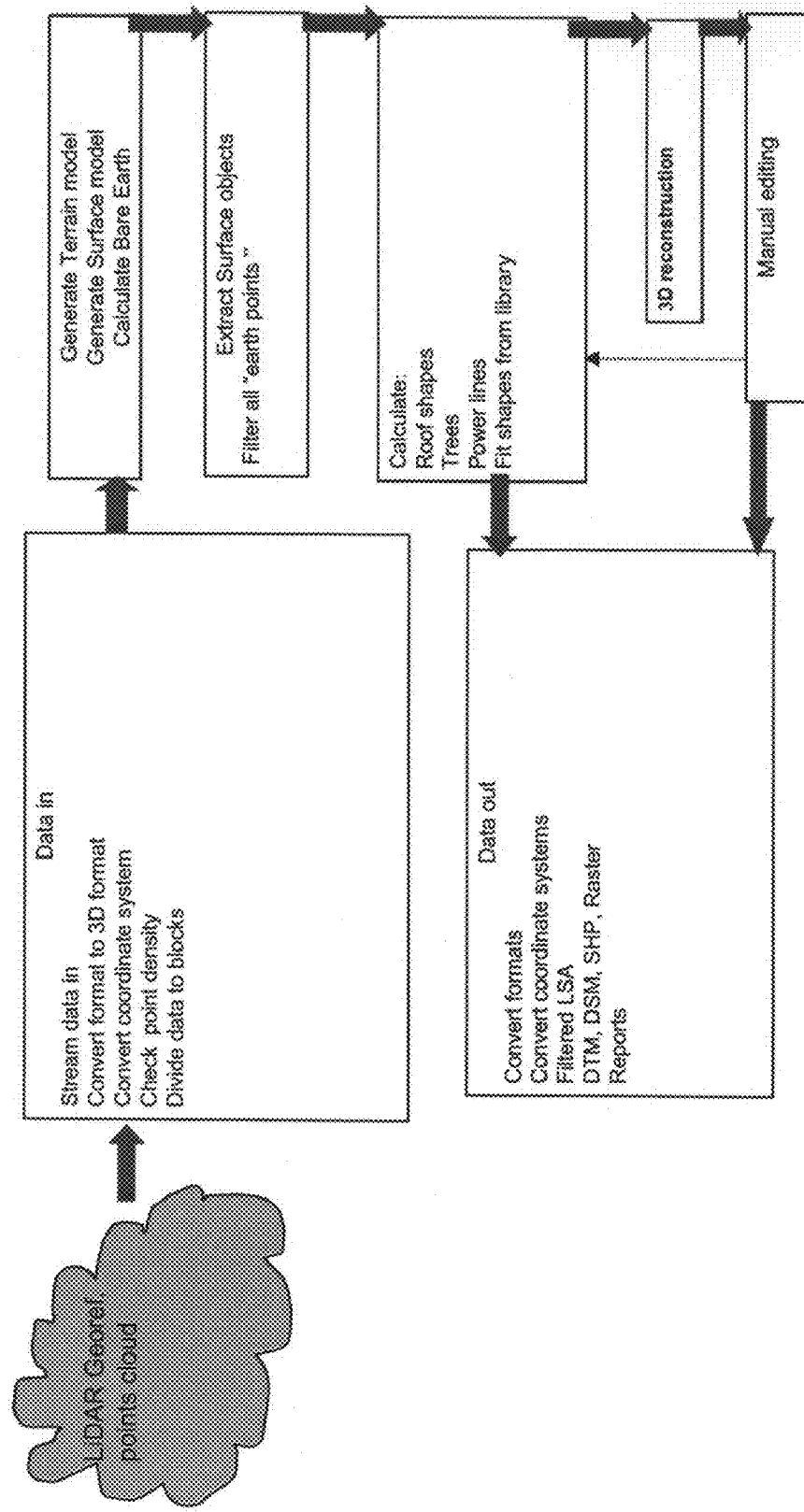

Reference is now made to FIG. 5, which is a flow chart showing the method of FIG. 4 in greater detail. The present embodiment is described in relation to airborne data but it is to be borne in mind that aircraft are not the only source of LiDAR data. In particular both terrestrial and satellite LiDAR are contemplated in the present disclosure.

In FIG. 5 the point cloud data is streamed in, and converted to a format appropriate for the following processing. The point density is checked, since too low a point density does not allow for object fitting. Thus a point density of a point per square meter of ground does not yield very much information about the surface structure and would not allow for surface features to be effectively identified. The higher the point densities the better the feature detection. Then the data structure is divided into blocks.

Once the data is in blocks then the ground level is identified using the digital terrain modeling technique discussed above. Ground points can then be filtered out and objects lying on the surface can be extracted. Viewed from above, the objects to be seen are likely to be roofs, trees, and power lines. Reconstruction and manual editing is carried out as described as the objects are inserted into the model and then output data is produced as required, in suitable formats.

FIG. 6 above shows a digital surface model (DSM) of the raw LiDAR data as presented directly from the point cloud. The surface model is constructed by applying a skin over the LiDAR points. Thus the roofs of FIG. 2 become solid shapes.

FIG. 7 shows how objects apparently identified from the raw LiDAR data as processed can be outlined by the search system following processing. Elevation points that define a plane are grouped together and a boundary drawn around as explained above. Tree objects are also outlined.

Figure 8:
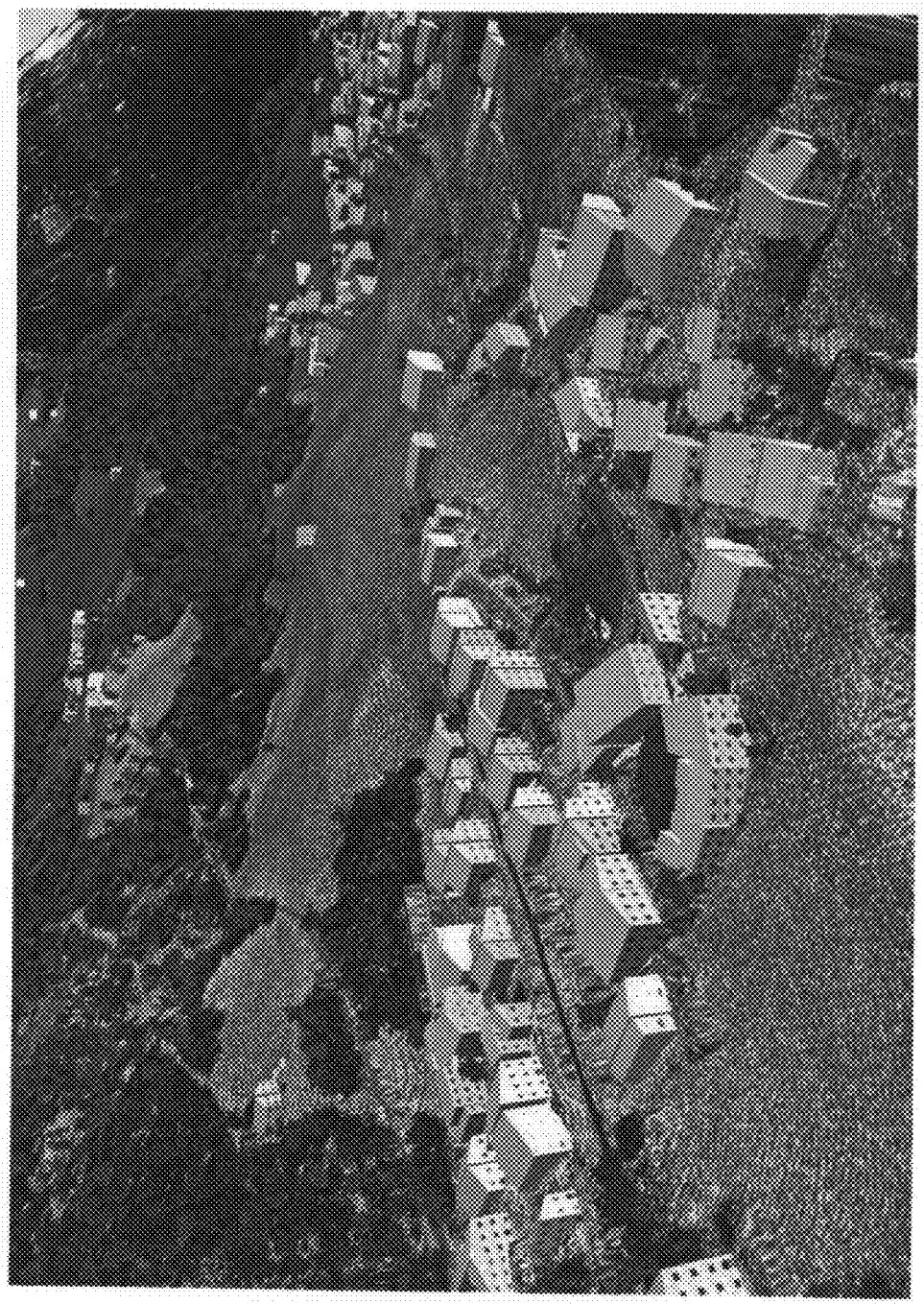

FIG. 8 shows building and tree objects that have been inserted to fit with the roof and tree outlines shown in FIG. 7.

FIG. 8 may be used as the system output together with the digital information of DTM, DSM and vector files.

The above described embodiments thus provide for automatic processing of LiDAR data, automatic extraction of the digital terrain model DTM (bare earth) and DSM information, automatic feature extraction, including extraction of buildings, trees, power lines and the like, automatic full scene 3D reconstruction, and a graphical user interface for expert based quality control. The input formats include any formats typically used for LiDAR data, such as LAS. Alternatively any ASCII format may be used. The output formats may include DTM, Shape files, DXF files and more. There is in principle no limitation on input file size. The application is suitable for fast parallel processing, and is based on a platform with a highly optimized 3D model for real-time applications. The result can be viewed on suitable 3D viewers.

As explained, the present embodiments process the LiDAR data by automatic creation of a virtual realistic 3D presentation of the processed information.

The processed data may be reviewed on a virtual realistic 3D presentation by combination of a 2D full area presentation and a 3D virtual realistic block.

As mentioned, the 3D processed results of the LiDAR may be manually edited.

Figure 9:
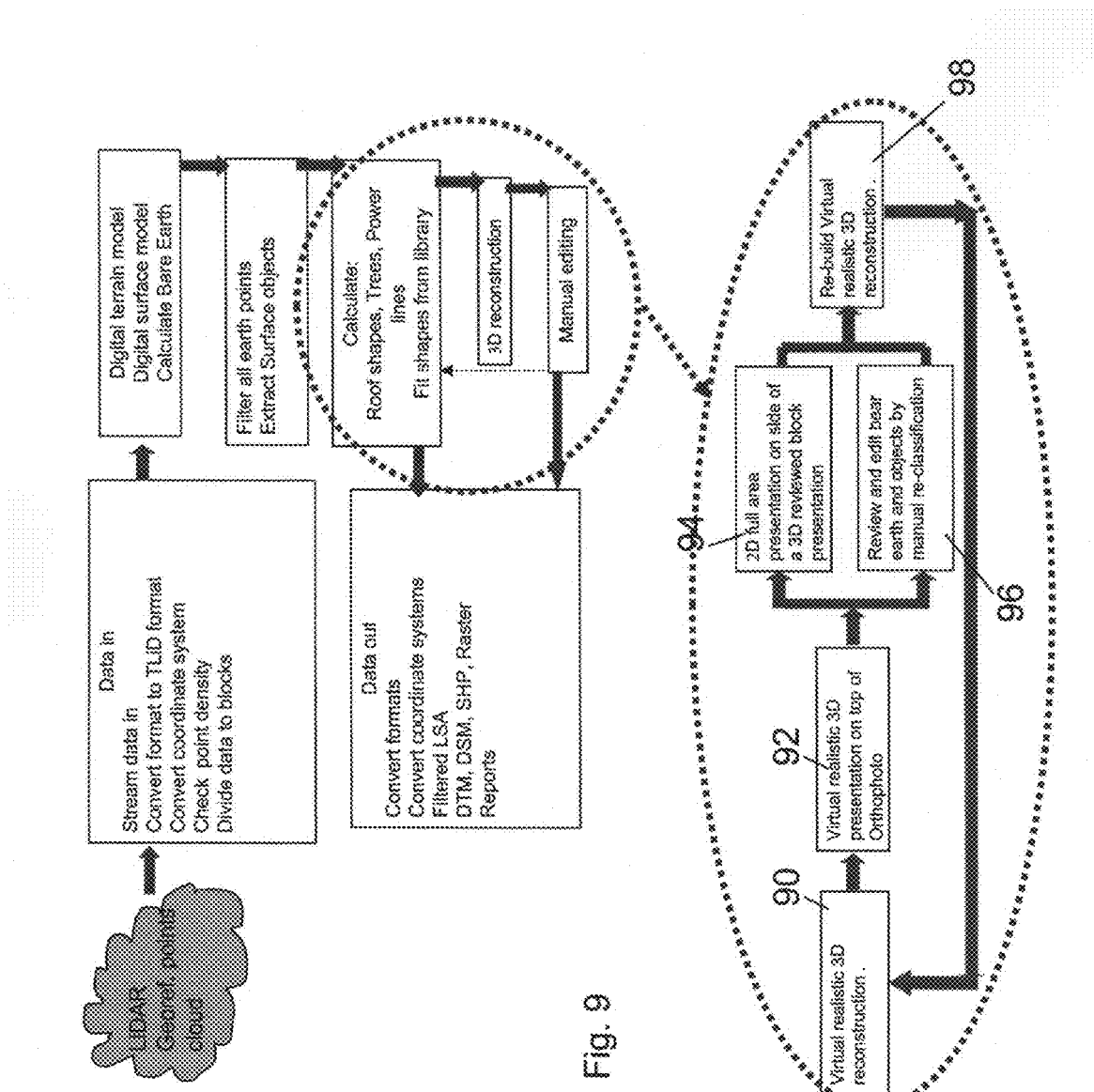

Reference is now made to FIG. 9, which expands on the process shown in FIG. 5 and shows in greater detail the three-dimensional reconstruction part of the process. The present embodiments process the LiDAR geo-referenced point cloud, and identify and filter out the bare earth as explained. The result is a Digital Elevation Model (DEM), and a classified LiDAR point cloud in which the embodiment identifies features and calculates roof shapes, trees, power lines etc. The result is modeled in 3D. In one embodiment a three dimensional virtual reality picture of the scene in 90 is produced by using an orthophoto as the background—block 92. In the absence of a colored orthophoto TLiD uses the LiDAR intensity to create a background picture for the presentation.

The user gets a 2D map of all the processed area in 94 on which the review area is marked and the areas which are already reviewed are marked as well. This method insures full area coverage of the review process. By looking at the virtual display in 96 and clicking on the automatically created 3D objects the user can rapidly check the quality of the automatic process. When the user estimates that an erroneous classification exists he clicks the suspicious location and marks the required change. Once the review is done the automatic LiDAR data processing runs again in 98, taking in consideration the inputs of the user by automatically changing parameters that influence the automatic process or by just placing the user requested objects in the user requested location.

Figure 10:
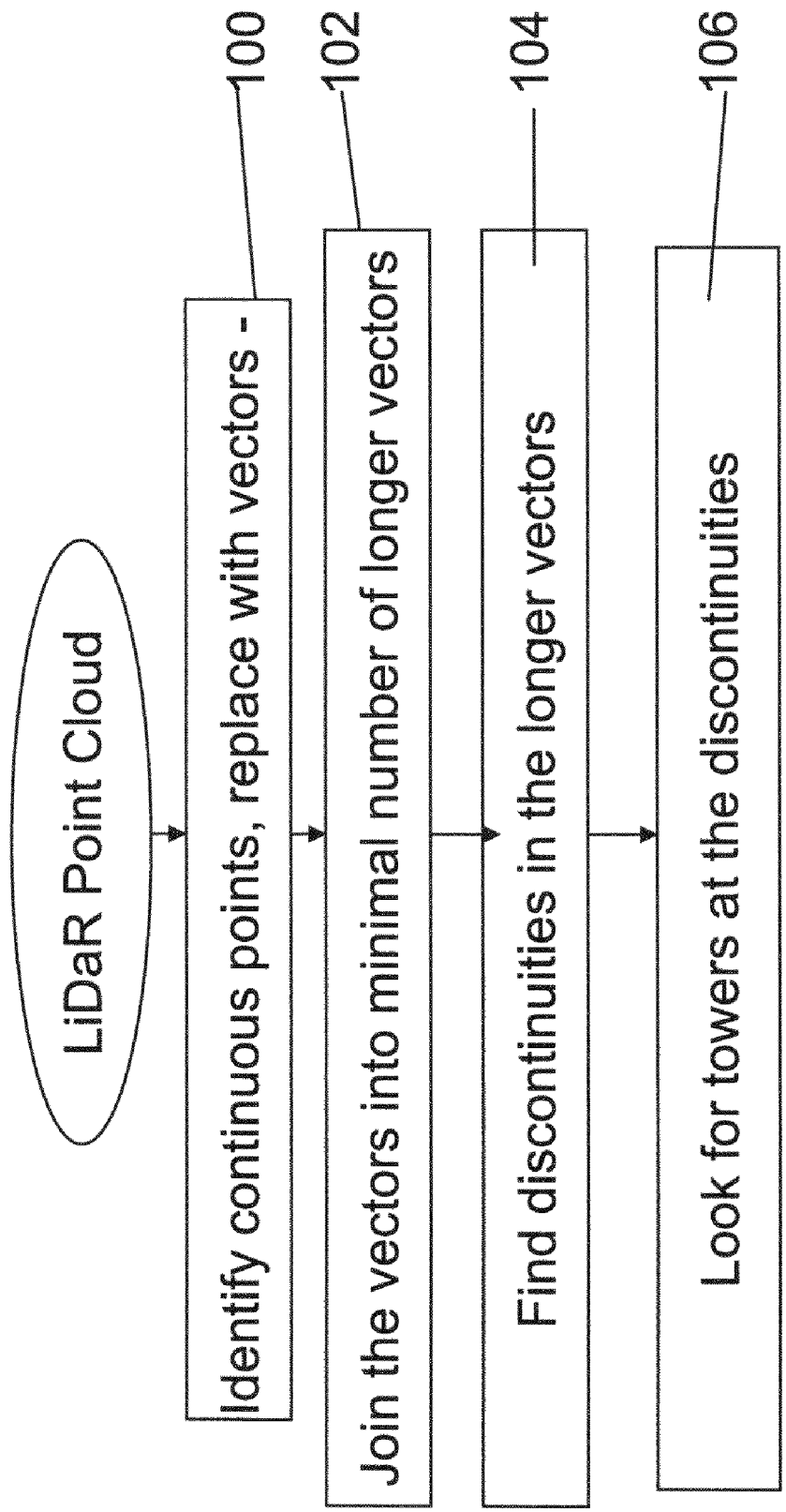
Figure 11:
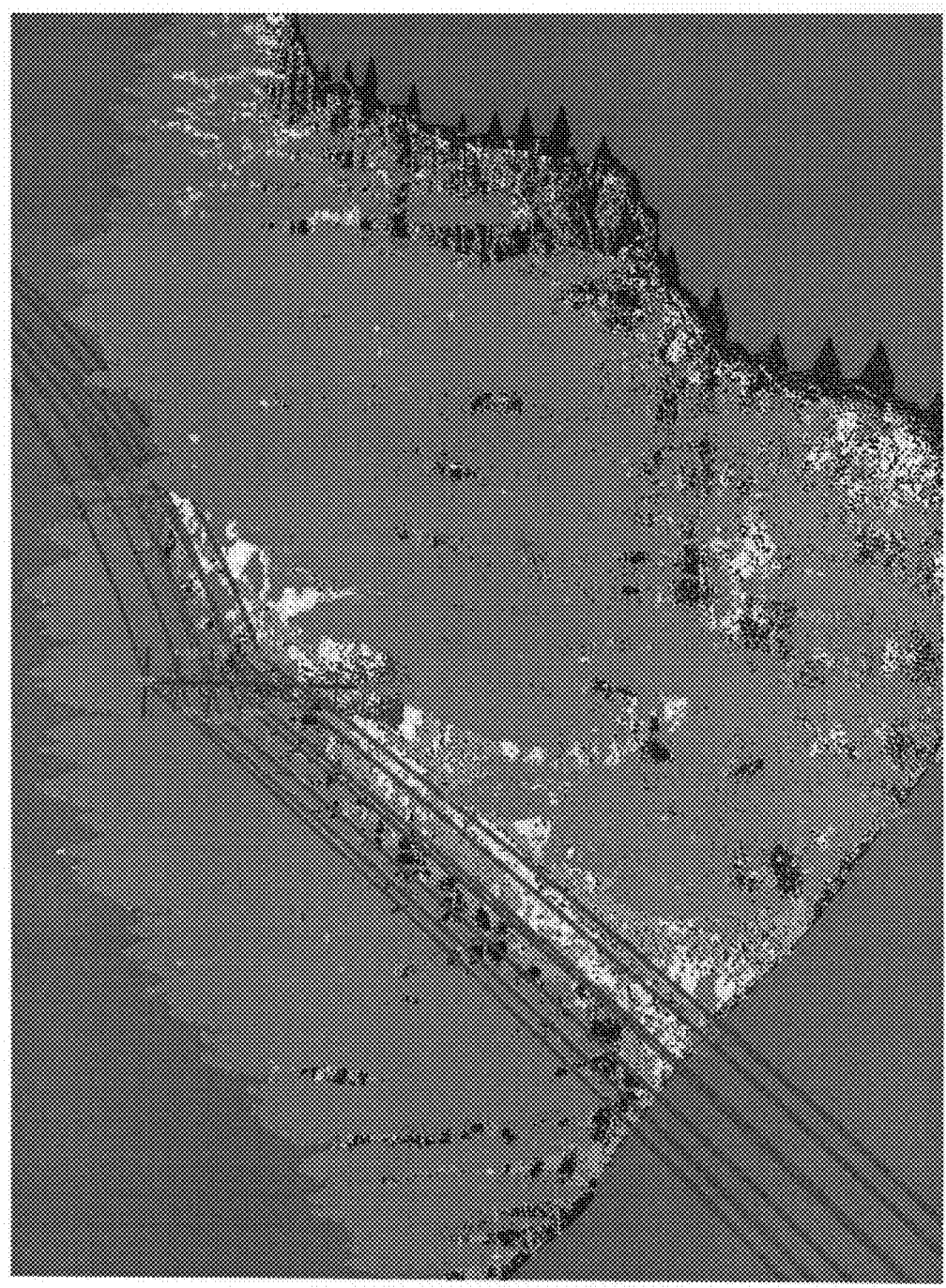

Reference is now made to FIG. 10, which is a simplified flow diagram illustrating a further embodiment of the present invention in which power lines may be identified and added to the model. Power lines differ from buildings, trees and other features in that they are of much smaller dimension, meaning that while some points of the power lines may be picked up, there are often lacking the points necessary for a computer to see the continuity. Current art for identifying power lines from LiDAR point clouds involves manually identifying the towers and power line suspension points and then manually indicating the points belonging to the power lines in between.

The disadvantage of the above is that it is slow. Power providers may be fined for power outages of significant duration and need to be able to identify problems such as trees growing too close to the power lines, buildings illegally put up under the power lines, etc in good time to prevent any power outages.

The embodiment of FIG. 10 allows for automatic identification of power lines. In a first stage 100, points in the point cloud are identified which appear to be parts of substantially horizontal lines. The points are joined together as a vector function.

In general there are gaps in the LiDAR scan so the result of the above stage is sections of disconnected vectors. A next stage 102 is then to join together the disconnected vectors into as few as possible continuous vectors. Such a continuous vector should represent the power line itself and in fact, surprisingly, actually provides an estimate of the lie of the power line even where it is completely obscured within vegetation.

The continuous lines end at certain places, giving locations of discontinuity—104. The next stage, 106, is then to look for a tower at the point of discontinuity.

Using the above system allows for automatic aerial-based monitoring of power lines, which often pass through remote areas and are difficult to monitor in any other way. The system outputs are a classified point cloud, with points classified as power lines and towers, an attachment point list which lists the points at which power lines are attached to the poles, the power line vectors themselves and a list of tower locations.

Figure 12:
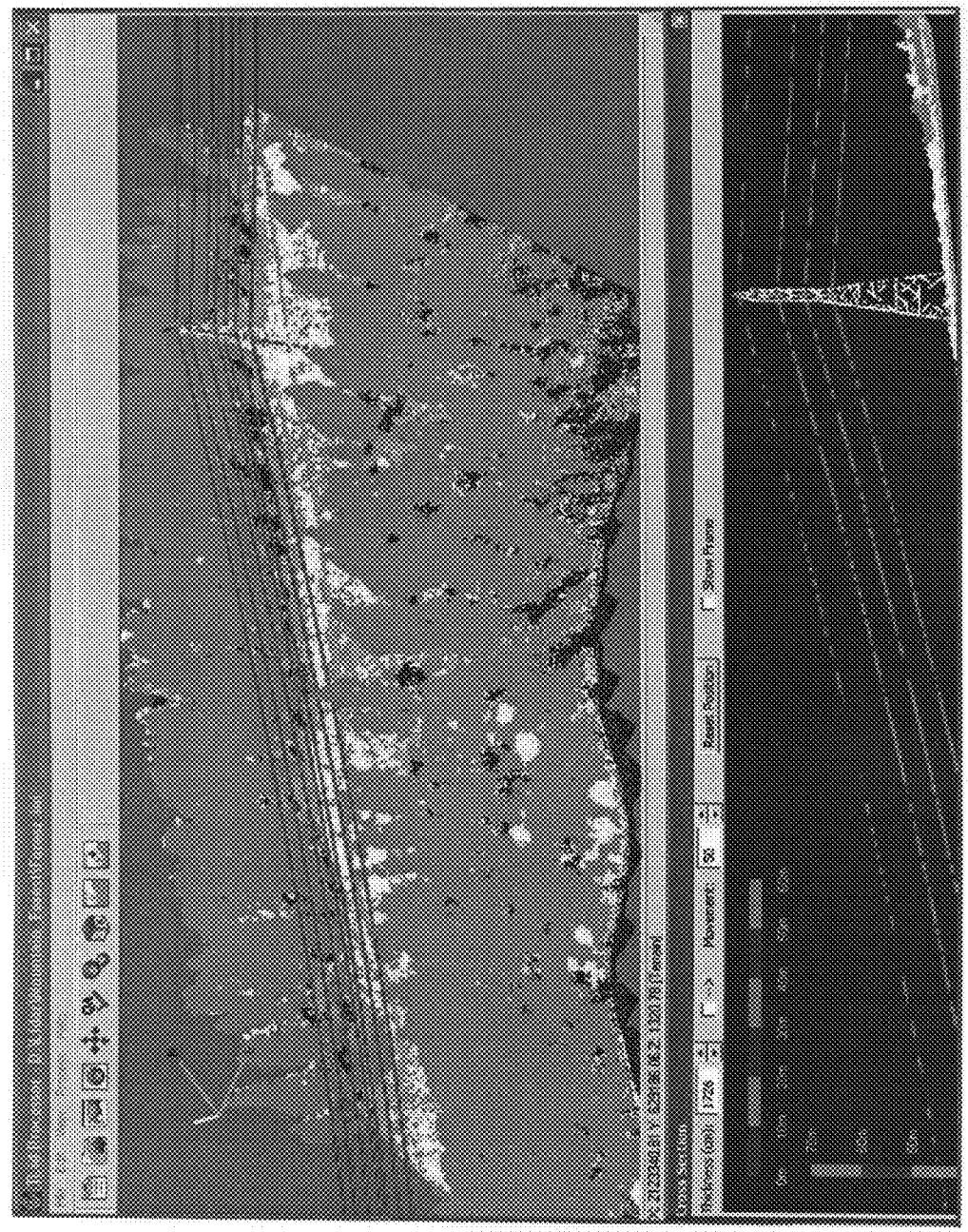
Figure 13:
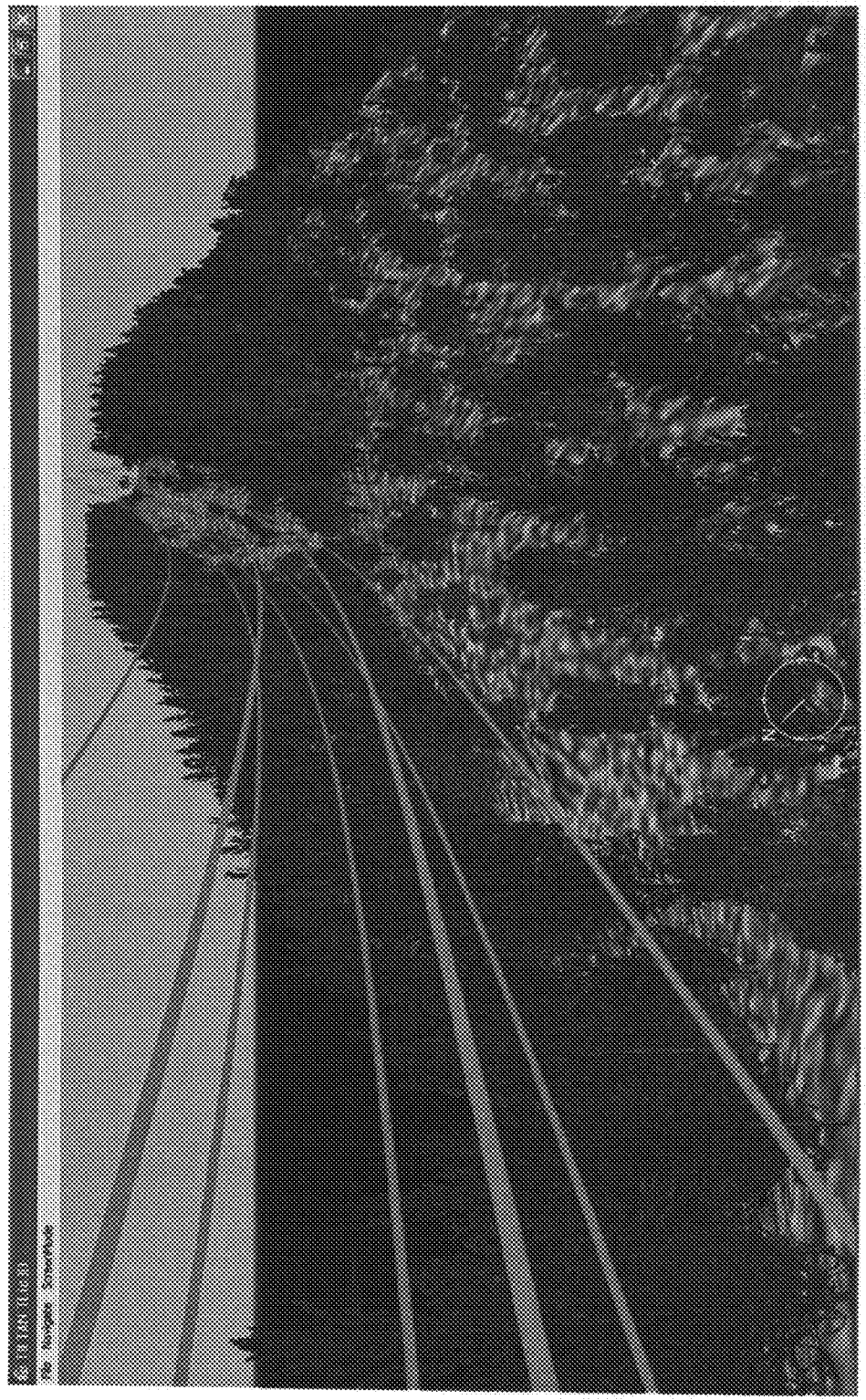
Figure 14:
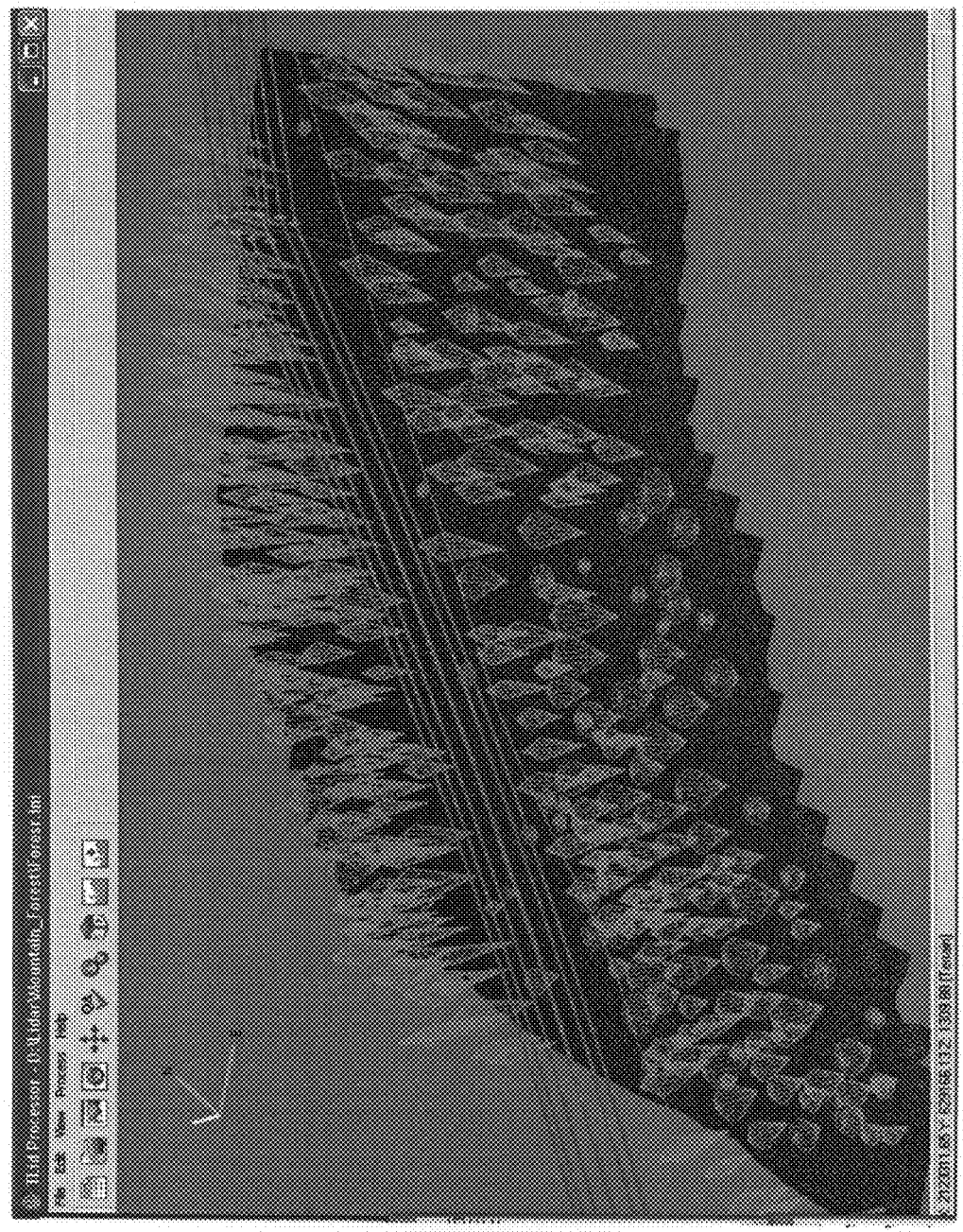
Figure 15:
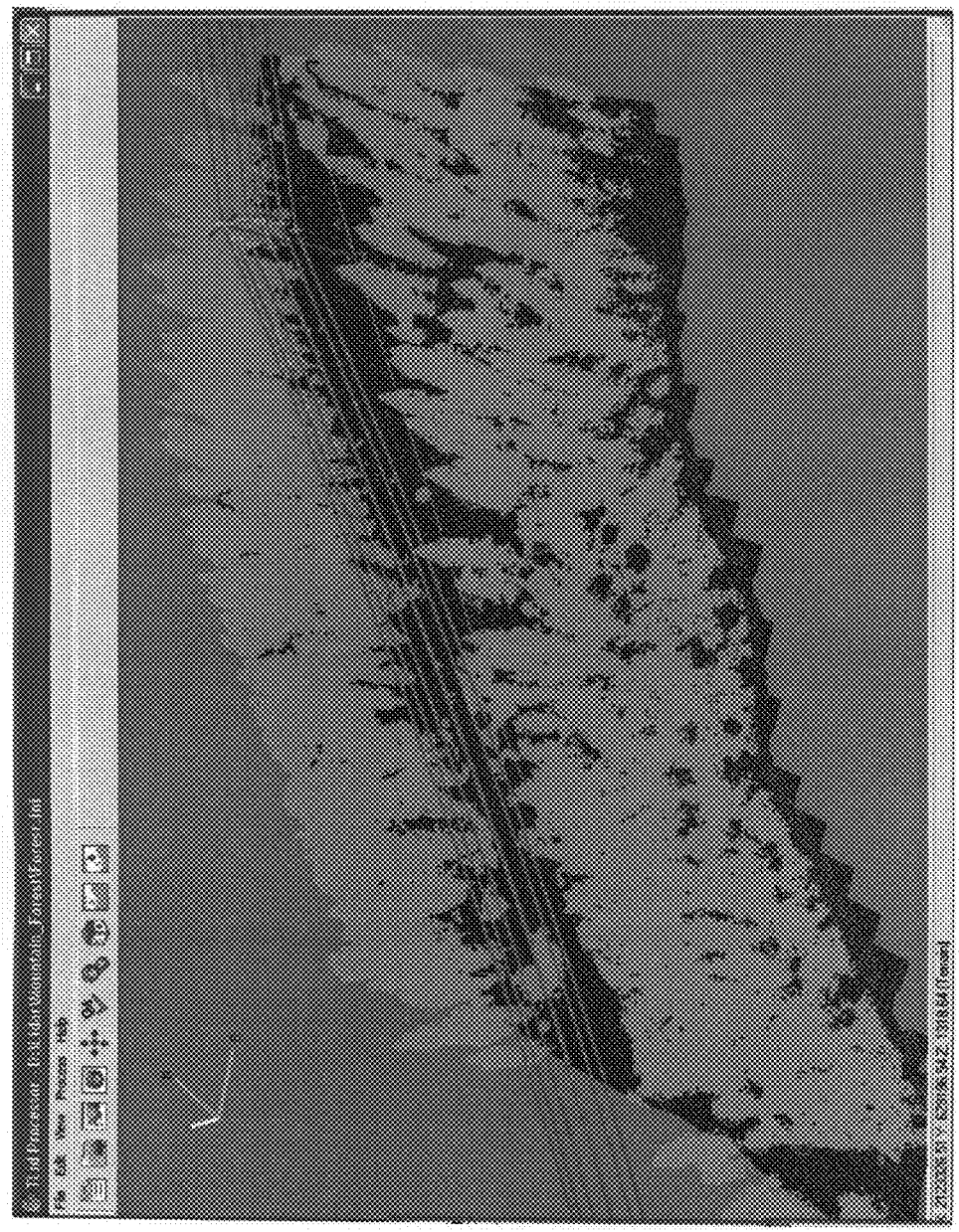

The outputs can be provided graphically, and examples of power lines in images created from LiDAR point clouds are shown in FIGS. 11-15. The data is stored in three dimensions so the figures can be viewed from different angles. FIG. 12 is a two part view showing the final image in the upper part and the original data forming the basis of the image in the lower part. That is to say the lower part shows only the disconnected vectors from which the presence of power lines was inferred. This allows the end user to evaluate the computer's decision about the presence of a power line.

Existing work relates to processing of LiDAR data and point clouds in general and it is known to transform a point cloud into bare earth and elevation objects. However none of the prior art automatically fits elevation objects or renders the processed data automatically into a 3D virtual image or 3D virtual model. Furthermore none of the prior art enables the user to edit the processed data by combining 2D and 3D views of the point cloud and the generated objects. That is to say the present embodiments allow viewing of the point cloud with the objects so that the correctness of the objects fitted over the points can be ascertained.

The current art merely teaches manual methods for transforming the 3D point cloud into objects and object layers. The user looks at a visualization of a point cloud, and points and clicks the corners of the 3D objects as they are seen in the point cloud.

The present embodiments by contrast automatically calculate the bare earth for filtering out the elevation objects. They then display a virtual reality picture of the processed data to the user enabling fast and accurate review of the results. The user can correct errors in the automatic calculation by clicking on the 3D objects and manually selecting object type.

It is expected that during the life of a patent maturing from this application many relevant LiDAR versions and variants and other laser and light based ranging systems will be developed and the scope of the term LiDAR is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Apparatus for processing of a LiDAR geo-referenced point cloud of a ground scan, comprising:
   a point cloud input for receiving said LiDAR point cloud said point cloud including ground topography and above-ground features,
   a ground filter for filtering out points that belong to the ground topography from the above ground features, thereby to isolate those points of said point cloud belonging to said above-ground features,
   an automatic feature search and recognition unit associated with said three dimensional graphical engine for searching said points belonging to said above-ground features to identify said above ground features therefrom and to replace points associated with a respective feature with a virtual object representing said feature, thereby to provide objects within said data; and
   a three-dimensional graphical modeler for generating a three dimensional model of said ground scan from said ground topography and said virtual objects.

2. The apparatus of claim 1, wherein said ground filter comprises a terrain modeler for searching said scan from below using a skin of relatively high rigidity to form a terrain model, and a surface modeler for searching said scan from above using a skin of relatively low rigidity to form a surface model, such that points appearing in said surface model but not in said terrain model are identifiable as said points belonging to said above-ground points.

3. The apparatus of claim 1, wherein said automatic feature search and recognition unit is configured to search said points belonging to above ground features for regions where said points lie substantially in a plane and to draw boundaries around said region, thereby to fit said virtual objects within said boundaries.

4. The apparatus of claim 1, further comprising a graphical user interface to allow a user to compare said virtual objects with said point cloud.

5. The apparatus of claim 4, wherein said graphical user interface is configured to support at least one member of the group of operations comprising: rotation, viewing of points, viewing of virtual objects and comparison between detected LiDAR points and virtual objects.

6. The apparatus of claim 5, wherein the graphical user interface is configured to support at least one member of the group of operations comprising: confirmation of virtual objects, rejection of virtual objects and addition of virtual objects.

7. The apparatus of claim 4, wherein the graphical user interface is configured to support a user suggestion for insertion of a virtual object and subsequent submission of said suggestion to said automatic feature search and recognition unit for consideration.

8. The apparatus of claim 1, further configured to assign vectors to one-dimensional substantially horizontal continuities in said points and to join said vectors together, said joined vectors being identified as power lines.

9. The apparatus of claim 1, further configured to find discontinuities in said joined vectors, and to identify towers at said discontinuities.

10. A method for processing of a LiDAR point cloud of a ground scan, comprising:
   receiving said LiDAR point cloud, said point cloud including ground topography and above-ground features,
   filtering out points that belong to the ground topography from the above ground features, thereby to isolate those points of said point cloud belonging to said above-ground features,
   automatically recognizing features therein, by searching said points of said LIDAR point cloud belonging to said above-ground features to identify said above ground features therefrom and to replace points associated with a respective feature with a virtual object representing said feature, thereby to provide objects within said ground topography; and
   generating a three dimensional model of said ground scan, said model comprising said automatically recognized features.

11. The method of claim 10, comprising filtering out points that belong to the ground from said point cloud, thereby to generate an elevation map showing features extending from the ground, therefrom to carry out said automatically recognizing.

12. The method of claim 10, further comprising searching said ground scan to compare points of said point cloud with recognized features, and
   replacing features according to said comparing.

13. The method of claim 12, further comprising providing a graphical user interface to allow a user to carry out said comparing.

14. The method of claim 13, comprising providing said graphical user interface with at least one member of the group of operations comprising: rotation, viewing of points, viewing of virtual objects and comparison between detected LiDAR points and virtual objects.

15. The method of claim 13, comprising providing the graphical user interface with at least one member of the group of operations comprising: confirmation of virtual objects, rejection of virtual objects and addition of virtual objects.

16. The method of claim 13, comprising providing the graphical user interface with a user suggestion for insertion of a virtual object into said model and subsequent repeating of said rendering.

17. The method of claim 13, comprising assigning vectors to one-dimensional substantially horizontal continuities in said points and to join said vectors together, said joined vectors being identified as power lines.

18. The method of claim 13, comprising finding discontinuities in said joined vectors, and identifying towers at said discontinuities.

* * * * *